US008844027B2

(12) United States Patent
Uruma

(10) Patent No.: US 8,844,027 B2
(45) Date of Patent: Sep. 23, 2014

(54) INFORMATION PROCESSING APPARATUS AND METHOD OF EXECUTING AN APPLICATION IN THE APPARATUS

(75) Inventor: Shuichi Uruma, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 13/702,508

(22) PCT Filed: Apr. 13, 2011

(86) PCT No.: PCT/JP2011/059671
§ 371 (c)(1),
(2), (4) Date: Dec. 6, 2012

(87) PCT Pub. No.: WO2011/155266
PCT Pub. Date: Dec. 15, 2011

(65) Prior Publication Data
US 2013/0086675 A1  Apr. 4, 2013

(30) Foreign Application Priority Data

Jun. 9, 2010  (JP) .................................. 2010-132413

(51) Int. Cl.
G06F 21/00 (2013.01)
G06F 21/34 (2013.01)
G06F 21/62 (2013.01)
G06F 21/33 (2013.01)
G06F 21/53 (2013.01)
G06F 9/46 (2006.01)
G06F 21/60 (2013.01)

(52) U.S. Cl.
CPC ........ *G06F 21/34* (2013.01); *G06F 2221/2101* (2013.01); *G06F 21/629* (2013.01); *G06F 2221/2141* (2013.01); *G06F 21/335* (2013.01); *G06F 21/53* (2013.01); *G06F 9/468* (2013.01); *G06F 2221/2119* (2013.01); *G06F 21/608* (2013.01); *G06F 21/6218* (2013.01); *G06F 2221/2117* (2013.01)
USPC ............................................. 726/20; 726/27

(58) Field of Classification Search
CPC ....... G06F 21/335; G06F 21/34; G06F 21/53; G06F 21/608; G06F 21/6218; G06F 21/629; G06F 21/468; G06F 21/0055; G06F 21/0075; G07F 7/1008
USPC .......................................................... 726/20
See application file for complete search history.

(56) References Cited

U.S. PATENT DOCUMENTS

| 6,279,111 B1* | 8/2001 | Jensenworth et al. | 726/10 |
| 6,308,274 B1 | 10/2001 | Swift | 713/201 |
| 2008/0144071 A1 | 6/2008 | Uchikawa | 358/1.14 |
| 2011/0286035 A1 | 11/2011 | Uruma | 358/1.15 |

FOREIGN PATENT DOCUMENTS

| EP | 2 093 657 A2 | 8/2009 |
| JP | 11-259426 A | 9/1999 |
| JP | 2002-517853 A | 6/2002 |

OTHER PUBLICATIONS

Yutaka Hirata, "Windows service wo tsukurou," C Magazine, Jun. 1, 2004, vol. 16, No. 6, pp. 52-57.
"Manpagez", Apr. 20, 2010, pp. 1-10, retrieved from the Internet: URL:https://web.archive.org/web/20100420105709/http://www.manpagez.com/man/5/launchd.plist.
Anonymous: "Web-based SSH—Wikipedia, the free encyclopedia", Apr. 1, 2010, pp. 1-3, retrieved from the Internet: URL:http://en.wikipedia.org/w/index.php?title=Web-based_SSH&oldid=356693537.

* cited by examiner

*Primary Examiner* — Yogesh Paliwal
(74) *Attorney, Agent, or Firm* — Fitzpatrick, Cella, Harper & Scinto

(57) ABSTRACT

An information processing apparatus capable of non-interactively executing an application and an application execution method are disclosed. In response to an issuance request of an access control token, if a user type described in a definition file is included in user types defined in the information processing apparatus, the information processing apparatus issues an access control token in accordance with a user type and executes process by an application, in a case that the user type of the access control token is contained in the user types that have the execution authority for the process by the application.

5 Claims, 7 Drawing Sheets

FIG. 7A

| ITEM | VALUE |
|---|---|
| USER TYPE | ADMINISTRATOR |

FIG. 7B

| No | VALUE |
|---|---|
| 1 | ADMINISTRATOR |
| 2 | GENERAL USER |

FIG. 7C

| PROCESS NAME | USER TYPE |
|---|---|
| LOG SECTION | ADMINISTRATOR |
| SETTING SECTION | ADMINISTRATOR |

INFORMATION PROCESSING APPARATUS AND METHOD OF EXECUTING AN APPLICATION IN THE APPARATUS

TECHNICAL FIELD

The present invention relates to a technology that assigns execution authority automatically on an application that operates on an information processing apparatus.

BACKGROUND ART

In computer systems, there is a system that designates a system administrator, and regulates users that execute system functions such that only the administrator can execute certain processes. For instance, a special user known as a system administrator is declared, and authority to execute functions related to system administration is only assigned to the system administrator. In this case, only a user that is recognized to be the system administrator through a user authentication process can execute functions related to system administration.

In general, a user is made to input a user name and password for the authentication process when a system is used interactively and the system then determines the validity of the user. In other words, if the input user name and password matches the user name and password of the system administrator, the user is recognized as a system administrator.

On the other hand, there are cases where functions must be non-interactively executed. For instance, the acquiring of regular operation logs etc must be carried out automatically without relying on user operation. In this case, since a user can not input the user name or password, a system will be required that determines, through other means, which user authorities will be used to execute a function.

According to the method described in Japanese Patent Laid-Open No. 11-259426, an operation method to set a start-up user, which determines which application is executed by what user authority, will be needed. For example, if an application is to be executed using system administration authority, the system administrator must be set as a start-up when installing the application. In this way, there is a problem when using an application in that a significant amount of time is taken to carry out installation of the application, since setting operation of a start-up user of the application is required when installing the application.

SUMMARY OF INVENTION

An aspect of the present invention is to eliminate the above-mentioned problems with the conventional technology.

A special feature of the present invention is that settings of a user who starts up an application do not need, which makes using an application more convenient.

According to an aspect of the present invention, there is provided an information processing apparatus capable of non-interactively executing an application, comprising: storage means for storing an application and a definition file describing a user type having execution authority of the application; issuance means for issuing an access control token according to a user type in response to an issuance request of the access control token from the application, in a case that the user type contained in the definition file is included in a user type defined for the information processing apparatus; and execution means for causing the application to execute a process in a case that the user type of the access control token issued by the issuance means is included in the user type that possesses the execution authority for the process by the application.

Further features and aspects of the present invention will become apparent from the following description of exemplary embodiments, with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 7A is a diagram showing an example of an application definition file.

FIG. 7B depicts a view illustrating an example of a user type list, and;

FIG. 7C depicts a view illustrating an example of an execution authority administrator database.

DESCRIPTION OF EMBODIMENTS

Embodiment of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
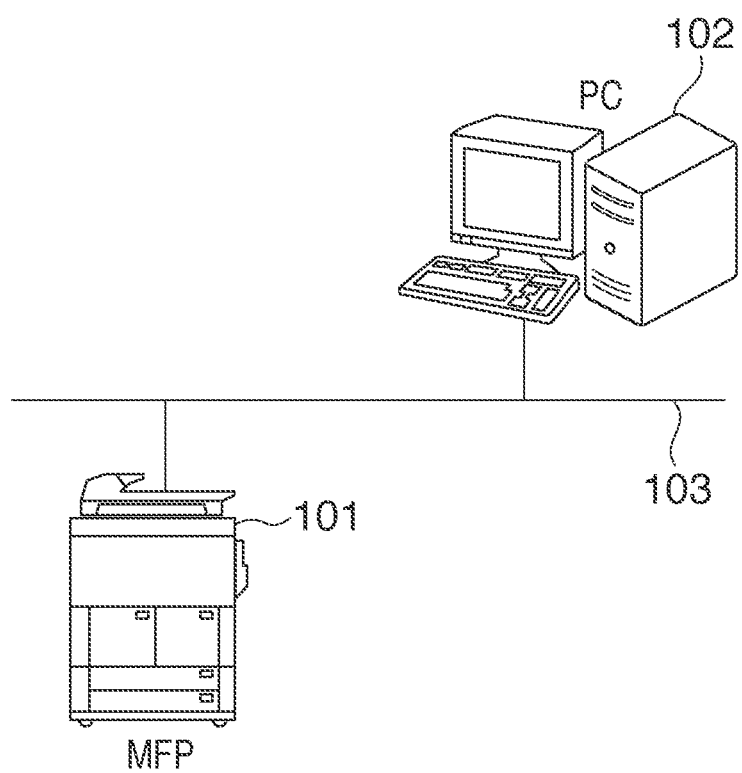
FIG. 1 is a diagram describing the overall system according to an embodiment of the present invention.

FIG. 1 is a diagram describing the entire system according to an embodiment of the invention.

An MFP (multi function peripheral) 101 and a PC 102 is connected with a LAN 103, and these devices are connected through the LAN 103, and can communicate both ways. A PC 102 is an information processing apparatus such as a personal computer. In addition, devices that are arranged as the MFP 101 and the PC 102 in the present invention are not limited to MFPs or PCs, for example, a PC may be placed in the position of the MFP 101, and another information terminal may be placed in the position of the PC 102. Also, many other devices and equipment can be connected to the LAN 103.

Figure 2:
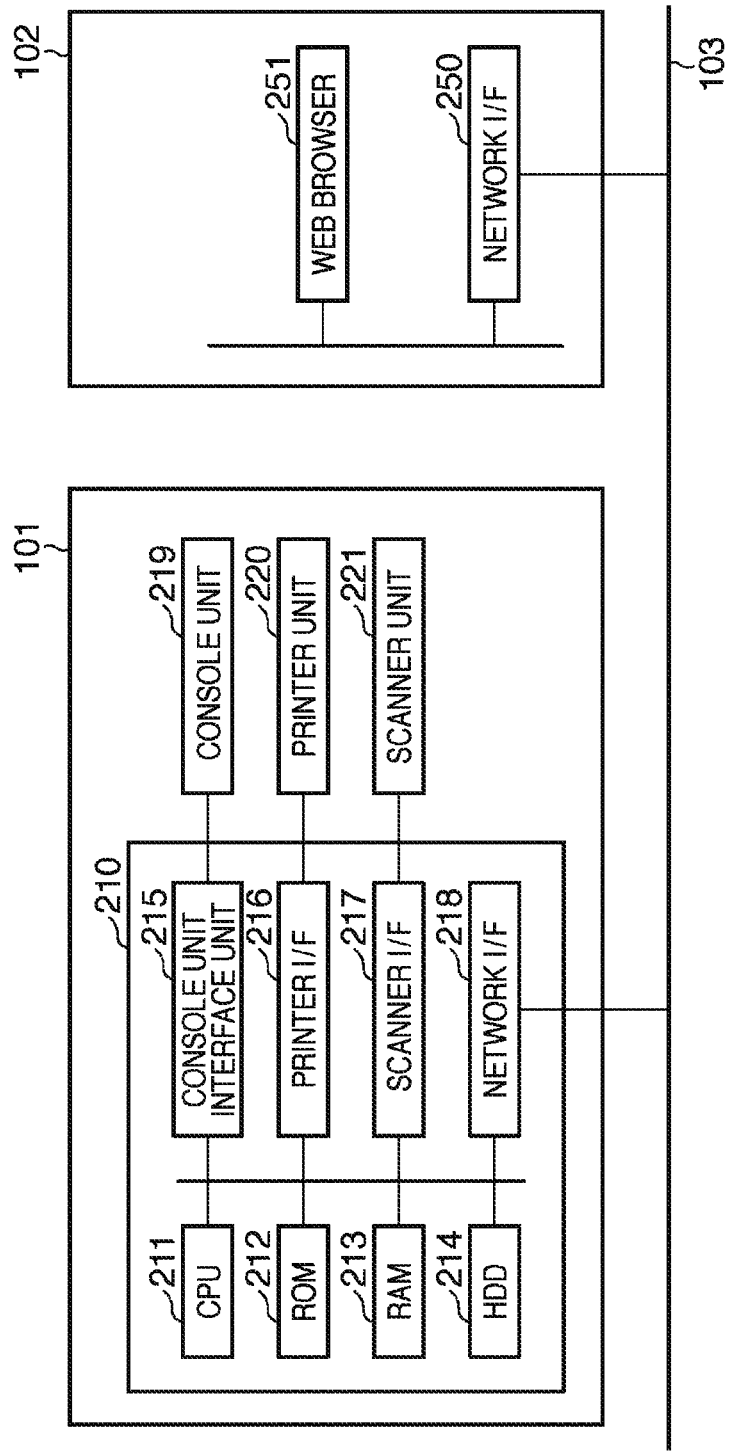
FIG. 2 is a block diagram that describes the architecture of the MFP and PC according to the embodiment.

FIG. 2 is a block diagram that describes the architecture of the MFP 101 and the PC 102 according to the present embodiment.

First, the MFP 101 architecture will be explained.

Figure 3:
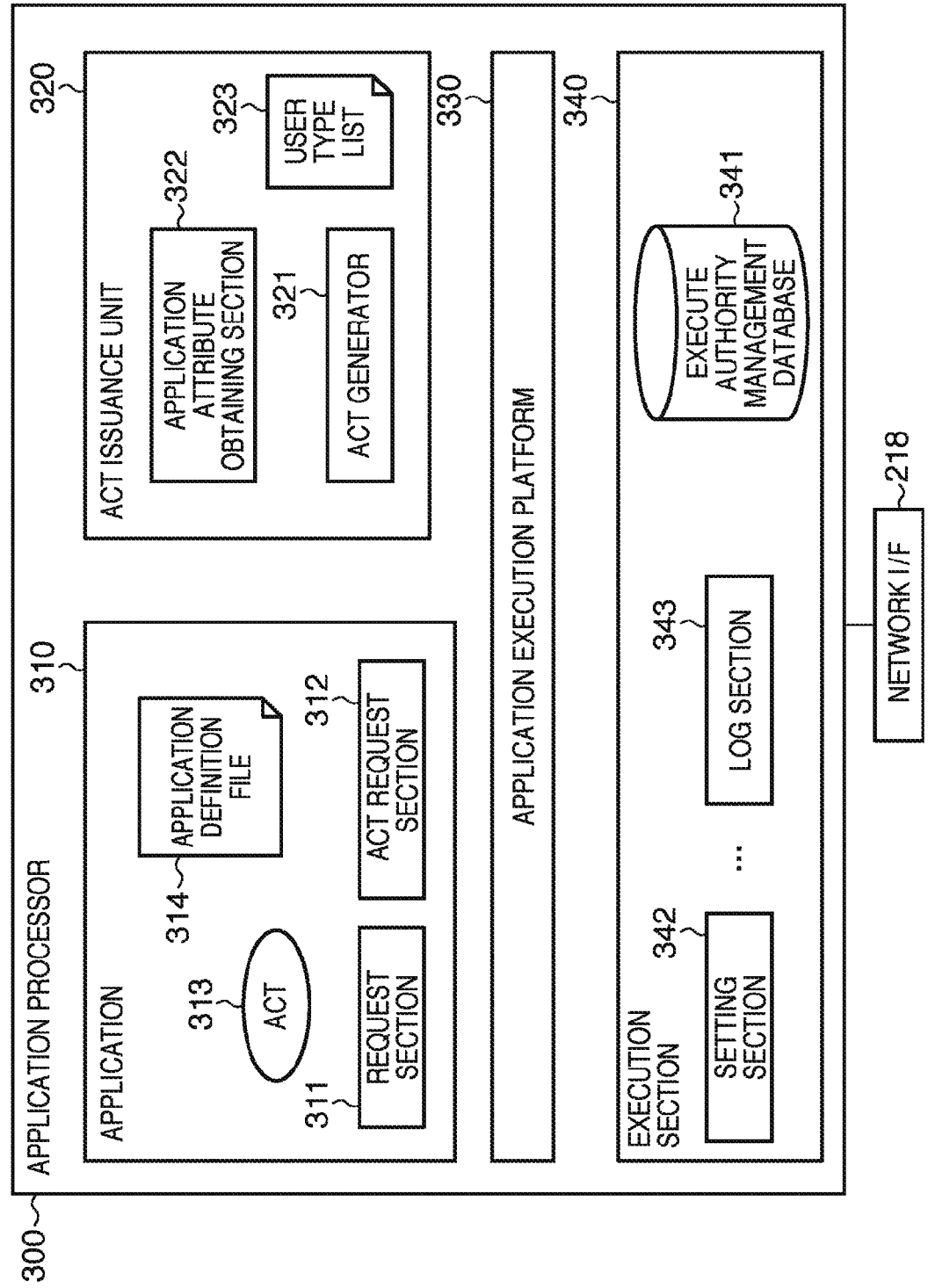
FIG. 3 is a block diagram describing a software configuration of the MFP according to the embodiment.
Figure 4:
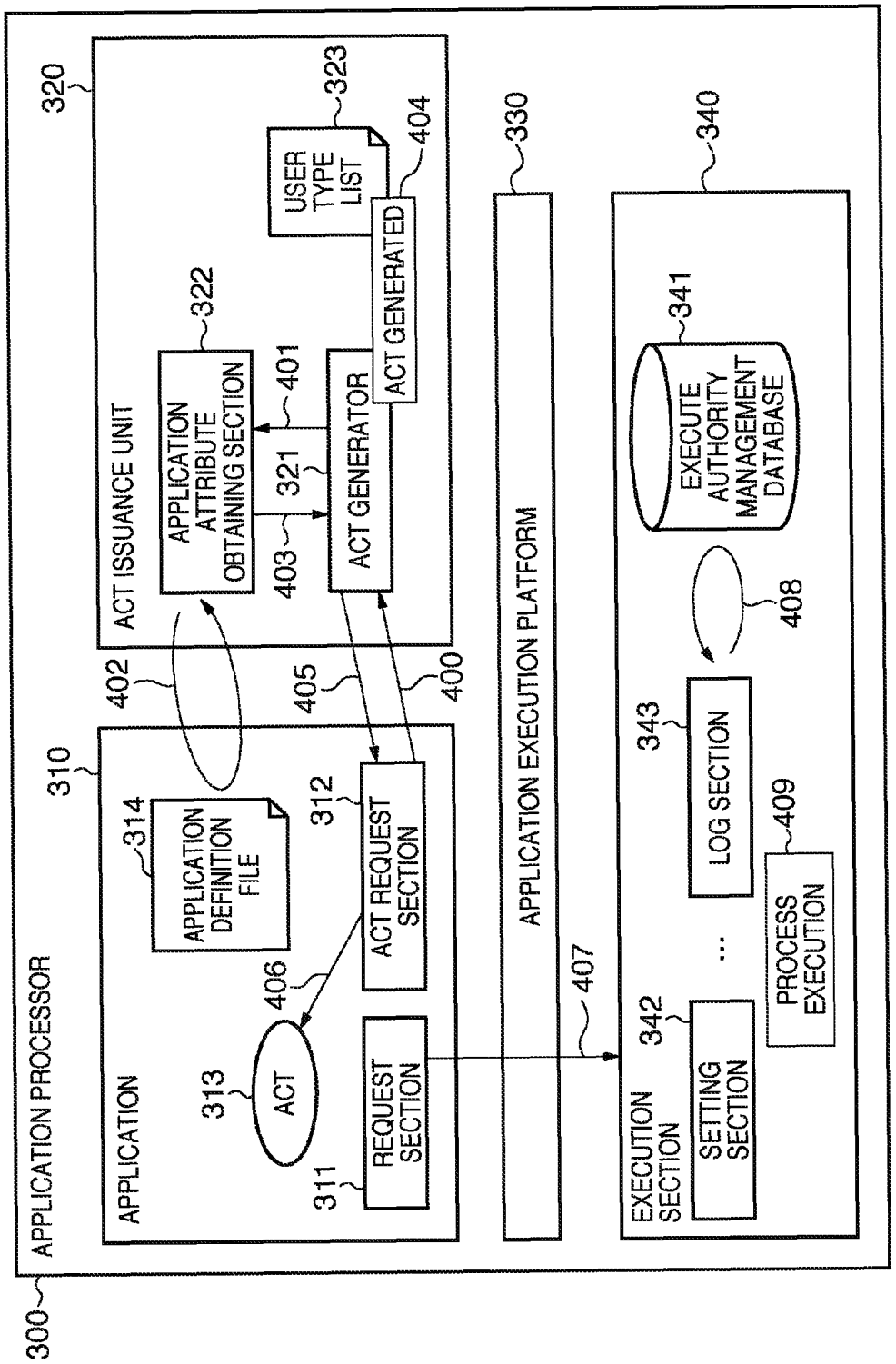
FIG. 4 is a diagram describing the MFP process flow as a block diagram, according to the embodiment.

A control unit 210 including a CPU 211 controls all operations of the MFP 101. Various controls, such as a read control of an original that uses a scanner unit 221 whereby a control program stored in a ROM 212 is read out, and a printer control that uses a printer unit 220 are carried out by the CPU 211. A RAM 213 is used as a temporary memory space, such as a work area or main memory for CPU 211. An HDD 214 stores image data and various programs, or an execute authority management database 341 (FIGS. 3, 4). A console unit interface unit 215 connects to a console unit 219 and the control unit 210. A printer I/F 216 connects to the printer unit 220 and the control unit 210. The image data to be printed by the printer unit 220 is forwarded from the control unit 210 to the printer unit 220 via the printer I/F 216, and printed on a sheet (recording medium) by the printer unit 220. A scanner I/F 217 connects to the scanner unit 221 and the control unit 210. The scanner unit 221 generates image data by reading an image from an original, and then supplies the image data to the control unit 210 via the scanner I/F 217. A network I/F 218 connects the control unit 210 (MFP 101) to the LAN 103. The network I/F 218 sends image data and various information to an external information processing apparatus (for example, PC 102 etc) connected to the LAN 103, and receives commands from the external information processing apparatus (for example, PC 102 etc) on the LAN 103 to install an application.

Next, the architecture for the PC 102 will be explained.

A network I/F 250 connects the PC 102 with the LAN 103. A Web browser 251 connects with the MFP 101 and various equipment on the LAN 103 via the network I/F 250, and displays a Web page based on received HTML data, and transmits data to the MFP 101 and various equipment on the LAN 103.

FIG. 3 is a block diagram that explains the software configuration of the MFP 101 according to the present embodiment. ACT is an abbreviation of Access Control Token, and functions of the MFP 101 that can be used by an application are specified. The following explanation is an explanation in the case where the MFP 101 non-interactively executes an application.

An application processor 300 is software that exists on the MFP 101, and is achieved by using each component of the control unit 210.

An application 310 operates on an application execution platform 330. The relationship between the application 310 and the application execution platform 330 is similar to the relationship between a Java application and a Java Virtual machine. The application 310 can be substituted, and by installing the application 310, the application 310 can be placed on the application processor 300. The application 310 is comprised of a request section 311 that requests processing towards an execution section 340, an ACT request section 312 that issues an ACT issuance request towards an ACT generator 321, and an application definition file 314 that describes attributes of the application 310. Also, if an ACT is acquired by the ACT request section 312 while executing the process, the acquired ACT is stored in a memory (RAM 213) as an ACT 313. The application definition file 314 describes information concerning under what user authority an application should operate.

FIG. 7A is a diagram describing an example of the application definition file.

In this example, item="user type," value="administrator" are set, and represent that this application must be executed by administrator authority.

An ACT issuance unit 320 carries out issuing processing of ACT. The ACT generator 321 generates an ACT from the ACT request section 312 based on the ACT issuance request. An application attribute obtaining section 322 acquires application attributes for the application 310 that are described in the application definition file 314, based on an application attribute acquisition request. When the ACT generator 321 generates an ACT, a user type list 323 is displayed.

FIG. 7B depicts a view illustrating an example of a user type list.

In this example, two user types exist, (No. 1) "Administrator" and (No. 2) "General User." In the present embodiment, in addition to being able to allocate these user types to a user ID which identifies an individual user that uses the MFP 101, user type allocation can be carried out towards the MFP 101 that is not a user. Also, in the present embodiment, an Administrator has execution authorities for a wider variety of operations than a General User. In other words, an Administrator has stronger execution authorities than a General User.

The execution section 340 carries out various processing based on a request from the application 310. A plurality of sections exist in the execution section 340, but FIG. 3 describes as an example, a setting section 342, and a log section 343. The setting section 342 displays and carries out various settings of settings values for the MFP 101. The log section 343 writes and acquires logs. When executing processing, the execution authority for each section is checked, and information in the execute authority management database 341 is used.

FIG. 7C depicts a view illustrating an example of data in the execute authority management database 341.

In this example, a user authority that corresponds to each section in the execution section 340, and which is required in order to execute processing by the execution section 340 is defined. The example in FIG. 7C shows that an Administrator authority is required as a user type in order for the setting section 342 and the log section 343 to carry out processing.

This concludes an explanation of the summary of the present embodiment. Next the process flow for the present embodiment will be explained. The process for the present embodiment can be generally divided into "Application installation" and "ACT issuance and process execution."

Figure 5:
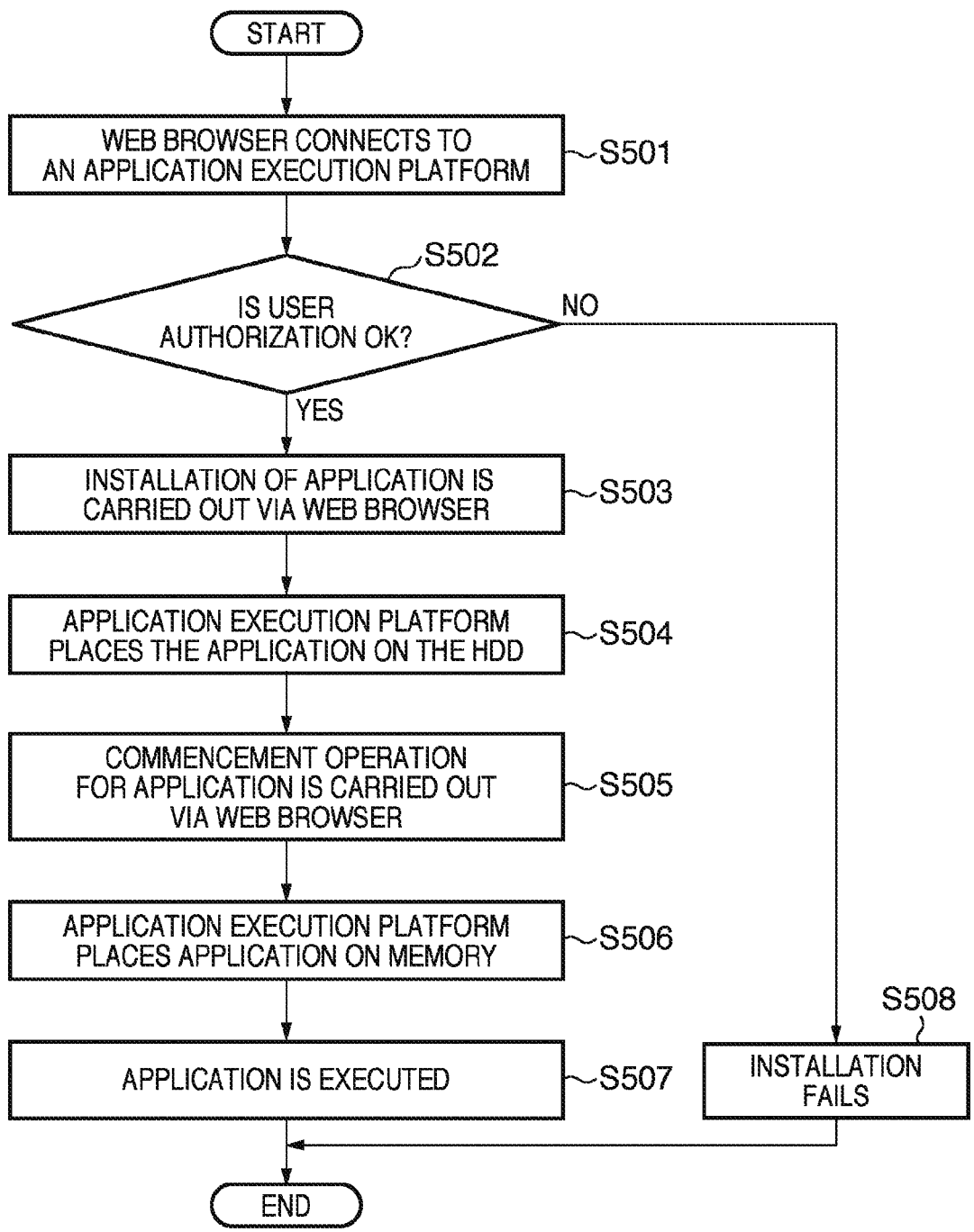
FIG. 5 is a flowchart describing an installation of an application to the MFP, according to the embodiment.

FIG. 5 is a flowchart describing application installation process for the MFP 101 according to the present embodiment.

First, in step S501, the Web browser 251 of the PC 102 connects to the application execution platform 330 of the MFP 101. After this connection, user authentication is carried out in step S502. In this case, any user authentication method may be used, but if the authentication fails, the process proceeds to step S508, and the process is treated as a failed installation, and the process ends.

In step S502, once the user authentication succeeds, the process proceeds to step S503, and installation of the application 310 is carried out via the Web browser 251. In step S504, the application execution platform 330 installs and emplaces the application 310 on the HDD 214 of MFP 101. At this time, the application definition file 314 contained in the application 310 can exist as a part of the data that makes up the application 310, or placed in the RAM 213 or the HDD 214 of the MFP 101. Next, the process proceeds to step S505, and a commencement operation of the application 310 is carried out through the Web browser 251. Through this, the application execution platform 330 deploys the application 310 in the RAM 213 of the MFP 101 in step S506. This allows the application 310 to become executable. Then, in step S507, the application 310 is executed. The above concludes the installation process flow for the application 310 on the MFP 101.

Next the ACT issuance and process execution flow will be explained.

Figure 6:
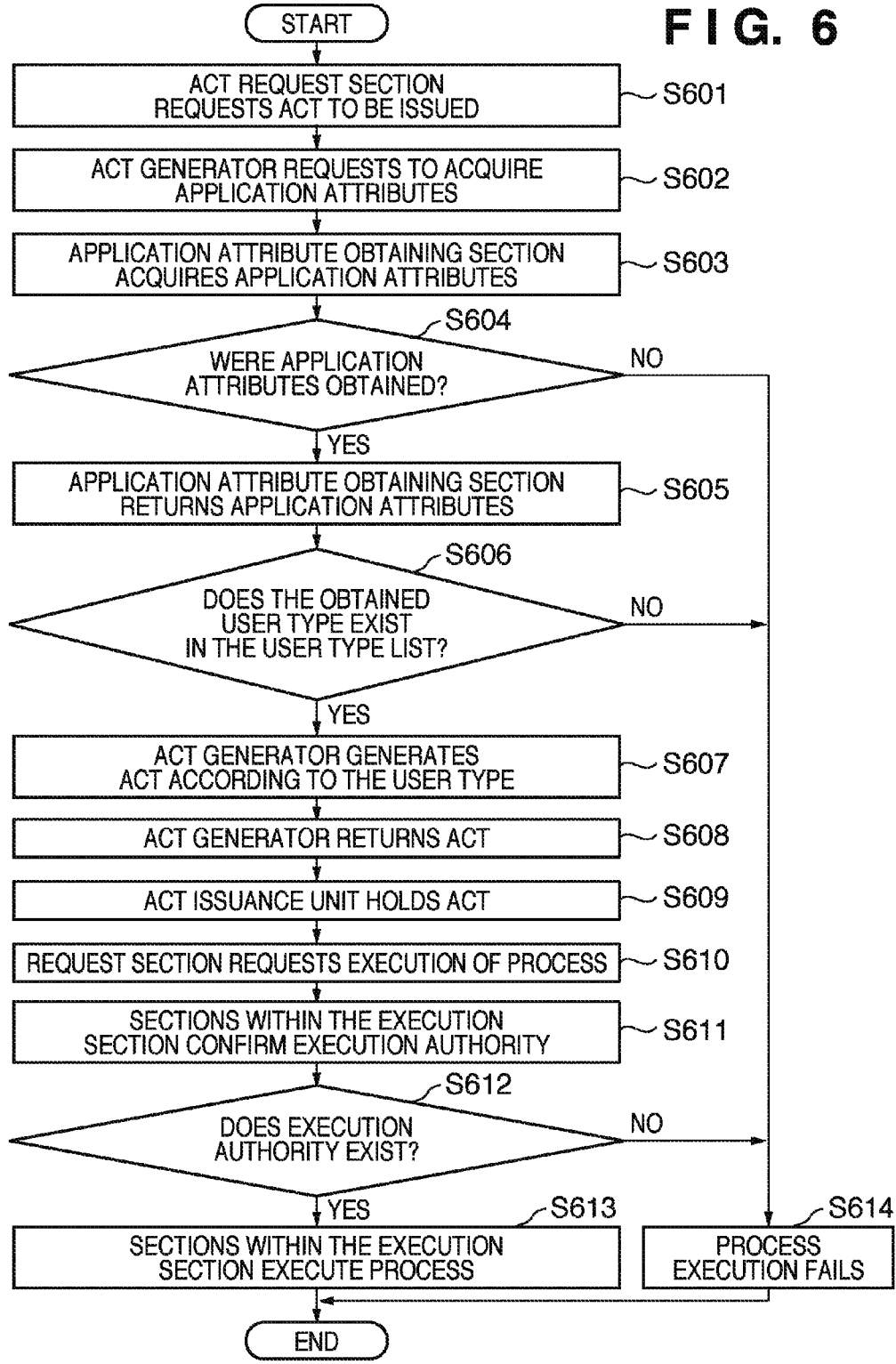
FIG. 6 is a flowchart describing the process execution and issuing of ACT by MFP 101, according to the embodiment.

FIG. 4 is a block diagram illustrating a process flow of the MFP 101 as a block diagram according to, and FIG. 6 is a flowchart of the same.

FIG. 6 is a flowchart describing the execution process by the application and ACT issuance by the MFP 101 according to the present embodiment. The following explanation is based on FIG. 4 and FIG. 6, shown below.

First, the ACT issue process will be explained.

First in step S601, the ACT request section 312 requests an ACT to be issued for the ACT generator 321 (400 in FIG. 4), once the application 310 commences processing on the MFP 101. The ACT generator 321 which receives the ACT issuance request then requests the application attribute obtaining section 322 to acquire application attributes (401 in FIG. 4) which are attributes of the application 310. The application attribute obtaining section 322 that receives the request to acquire the application attributes then displays the application definition file 314 in step S603, and the application attributes for the application 310 are obtained (402 in FIG. 4), and returned to the ACT generator 321. Next the process proceeds to step S604, and the application attribute obtaining section 322 determines whether or not the attributes were able to be obtained, and if they were not obtained, the process proceeds to step S614, and the process ends as if the execution of the process has failed.

On the other hand, if the application attributes were able to be obtained in step S604, the process proceeds to step S605, and the application attribute obtaining section 322 returns the obtained application attributes to the ACT generator 321 (403 in FIG. 4). Next, in step S606, the ACT generator 321 that received the application attributes extracts the user type from the application attributes, and determines whether or not that the extracted user type exists in the user type list 323 (FIG. 7B). If it is determined that the user type does not exist in the user type list 323, then the process proceeds to step S614 as it cannot issue an ACT, and ends the process as if execution of the process has failed.

In step S606, if the user type exists in the user type list 323, then the process proceeds to step S607, and the ACT generator 321 generates an ACT that corresponds to the user type that is described in the user type list 323 (404 in FIG. 4). In step S608, the generated ACT is returned to the ACT request section 312 (405 in FIG. 4). Next, the process proceeds to step S609, and the ACT request section 312 that receives the ACT saves the ACT 313 in the RAM 213 related to the application 310 (406 in FIG. 4). This ends the issuance of the ACT. Next, the execution process flow that uses the ACT 313 will be explained.

In step S610, the request section 311 requests (issues a process execution request) the execution of the process that is to be executed on the application 310 for the execution section 340 (407 in FIG. 4). At this time, the request section 311 hands the acquired ACT 313 to the execution section 340. A plurality of sections exist in the execution section 340, where at least one of the sections receives the process execution request. The following is an example wherein the log section 343 has received the process execution request.

In step S611, the log section 343 that receives the process execution request accesses the execute authority management database 341 (FIG. 7C), and determines the required user type for the log section 343 to carry out processing. Next the process proceeds to step S612, and the log section 343 determines whether or not the required user type is contained in the received ACT (408 in FIG. 4). If the required user type is not contained in the ACT, or in other words, if there is no execution authority for the application 310, then the process proceeds to step S614, and the process ends as a failed execution. On the other hand, in step S612, if the user type required to carry out the processing is contained in the ACT 313, or in other words, if the execution authority for the application 310 exists, then the process proceeds to step S613, and the log section 343 executes acquisition of logs and writing of logs (409 in FIG. 4). While it is not shown here, a specific example of processes such as, the log section 343 acquiring logs, then returning the logs to the application 310, and the application 310 outputting the acquired logs to a file, is given.

For the embodiment given above, an ACT according to a user type that possesses execution authority for a variety of operations is generated when a plurality of user types are described in the application definition file 314. A user type that possesses execution authority for a variety of operations includes user types which possess stronger execution authority, or, which can execute limited processes. The process is carried out in detail as follows.

If a plurality of user types are described in the application definition file 314, the ACT generator 321 receives a plurality of user types through the application attribute obtaining section 322. Then, the user types are compared with the user types described in the user type list 323, and those user types (in FIG. 7B, number "1" is an administrator) that possess execution authority for a wide variety of operations are selected (for instance, the number is smaller in FIG. 7B). In this way, the ACT generator 321 generate an ACT according to the selected user types.

According to the embodiment explained above, it is possible to automatically determine which application is to be executed by what user authority according to a destination in which the application is installed.

OTHER EMBODIMENTS

Aspects of the present invention can also be realized by a computer of a system or apparatus (or devices such as a CPU or MPU) that read out and execute a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-132413, filed Jun. 9, 2010, which is hereby incorporated by reference herein in its entirety.

The invention claimed is:

1. An information processing apparatus for non-interactively executing an application, the information processing apparatus comprising:

a memory configured to store an application and a definition file describing a user type having execution authority for the application, wherein the application and the definition file are stored in the memory upon installing the application in the information processing apparatus; and a CPU coupled to the memory, wherein the CPU is programmed to provide:

an issuance unit configured to issue, in response to an issuance request for an access control token from the application, the access control token according to a user type, in a case where the user type contained in the definition file is included in a user type defined in the information processing apparatus, wherein the access control token specifies a function of the information processing apparatus that can be used by the application; and an execution unit configured to cause the application to execute a process by the application, in a case where the user type of the access control token issued by the issuance unit is included in a user type that has execution authority for the process to be executed by the application.

2. The information processing apparatus according to claim 1, wherein the CPU is further programmed to provide an execute authority management database configured to describe user types having execution authority for processes by the application, according to types of the processes to be executed by the application, wherein the execution unit determines whether or not the user type of the access control token is contained in the user type that has the execution authority for the process to be executed by the application.

3. The information processing apparatus according to claim 1, wherein, in a case where there are a plurality of user types defined in the information processing apparatus, the issuance unit issues the access control token according to a user type that has execution authority for a wide variety of operations.

4. An application execution method for non-interactively executing an application in an information processing apparatus, the application execution method comprising steps of:

storing, in a memory, an application and a definition file which contains user types having execution authority for the application, wherein the application and the definition file are stored in the memory upon installing the application in the information processing apparatus;

issuing an access control token according to an issuance request for the access control token from the application, in a case where the user type described in the definition file is included in a user type defined in the information processing apparatus, wherein the access control token specifies a function of the information processing apparatus that can be used by the application; and executing a process by the application, in a case where a user type of the access control token issued in the issuing step is contained in a user type that has execution authority for the process to be executed by the application.

5. A non-transitory storage medium storing a program that when executed causes a computer to perform an application execution method for non-interactively executing an application, the application execution method comprising steps of:

storing, in a memory, an application and a definition file which contains user types having execution authority for the application, wherein the application and the definition file are stored in the memory upon installing the application in the information processing apparatus;

issuing an access control token according to an issuance request for the access control token from the application, in a case where the user type described in the definition file is included in a user type defined in the information processing apparatus, wherein the access control token specifies a function of the information processing apparatus that can be used by the application; and executing a process by the application, in a case where a user type of the access control token issued in the issuing step is contained in a user type that has execution authority for the process to be executed by the application.

* * * * *